A. FRIEBERTSHAUSER.
Clasp-Knife.
No. 226,910.  Patented April 27, 1880.
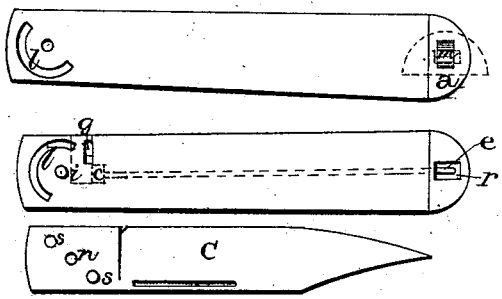
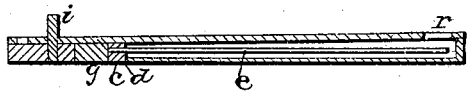
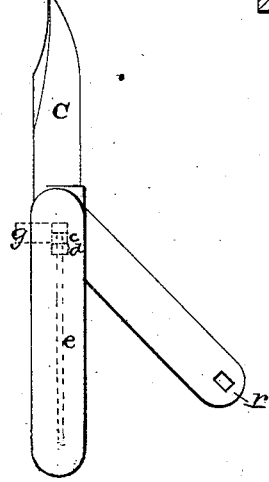
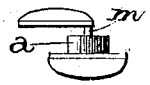
Witnesses:
N. W. Mortimer
Chas. H. Isham
Inventor:
A. Friebertshauser,
per
F. A. Lehmann,
Atty

UNITED STATES PATENT OFFICE.

AUGUST FRIEBERTSHAUSER, OF BEAVER FALLS, PENNSYLVANIA.

CLASP-KNIFE.

SPECIFICATION forming part of Letters Patent No. 226,910, dated April 27, 1880.

Application filed January 27, 1880.

*To all whom it may concern:*

Be it known that I, AUGUST FRIEBERTSHAUSER, of Beaver Falls, in the county of Beaver and State of Pennsylvania, have invented certain new and useful Improvements in Clasp-Knives; and I do hereby declare the following to be a full, clear, and exact description of the invention, such as will enable others skilled in the art to which it pertains to make and use it, reference being had to the accompanying drawings, which form part of this specification.

My invention relates to an improvement in clasp-knives; and it consists in a pivoted shoulder having connected to it a catch, which catch, when turned in the proper position, will enter a slot in the opposite side of the handle and serve to lock the two parts of the handle together, so that they cannot be opened until the shoulder has again been turned at right angles.

This invention is intended as an improvement upon that class of knives in which one of the parts of the handle is revolved or turned entirely around upon its pivot for the purpose of opening the blade, and which handle is provided with an endwise-moving locking-bolt, which prevents the handle from being opened until the bolt has been withdrawn.

The accompanying drawings represent my invention.

Figure 1 is a detail view of the two parts of the handle and the blade ready to be put together. Fig. 2 is a section of one-half of the handle. Figs. 3 and 4 are detail views. Fig. 5 shows the knife complete in the act of being opened.

A and B represent two disconnected halves of the handle of a knife, each having an outside and inside piece riveted together, the inside being a plate of steel or iron, such as is usually employed in handles for clasp-knives.

Near the end of the handle is a pivot, $i$, which passes through an opening, $n$, in the heel of the blade, and is riveted at the outside to hold together the two parts of the handle, while it is also the pivot around which the blade moves. Around the pivot $i$, at the inside of both halves of the handle, are semicircular grooves $l$, which, when placed the one upon the other, correspond exactly, their ends being on a diagonal line through the central pivot, $i$. At the other end of one of the halves of the handle is pivoted the shoulder $a$ by means of the catch $m$. This shoulder is just about the thickness of the heel of the blade, and is secured to the catch in such a manner that the two parts move together.

When the knife is closed and the blade locked in position, the shoulder is in the position shown in solid lines in Figs. 1 and 3; but when the knife is just ready to be closed the shoulder is turned one-half around, as shown in dotted lines in Fig. 1 and solid lines in Fig. 5, so as to bring the catch $m$ in such a position that it will enter the hole $r$ in the other half of the handle. As soon as the two halves of the handle are thus closed the shoulder is turned back into position again, thus bringing the catch at right angles to the hole $r$, so as to lock the two halves together in such a manner that the knife cannot be opened until the shoulder has been turned into the position shown by the dotted lines.

In order to lock the knife and prevent the shoulder from being turned around, a slide, $c$, is placed in a groove, $d$, in the end of the handle in which the blade is pivoted, and connected to this slide is a locking-rod, $e$, which can be moved endwise, so as to pass through the hole in the catch $m$. While this rod catches in the hole in the catch the shoulder cannot be turned around, and hence the knife is locked so that it cannot be opened by a person who does not understand the locking mechanism.

Moving at right angles to the slide $c$ is a second one, $g$, which can be moved outward so as to allow the slide $c$ to be moved endwise, and thus cause the rod $e$ to lock or unlock the catch; but when the slide $c$ is moved into its recess and the slide $g$ is pushed into place the one, $c$, is locked in place, and the locking mechanism is so concealed that no one except those who know how can open the knife.

C represents the blade of the knife, having a hole, $n$, in its heel for the pivot $i$ to pass through. From the heel of the blade project two pins, $s$, one at each side, and at a distance from the pivot equal to that of the grooves $l$, and so placed that if one pin in a groove reaches its upper terminus the other is found at its opposite lower end. If, now, the two halves of the handle are turned in opposite directions until they again meet, the pins $s$ are pressed against on opposite sides at the ends of the grooves, and held firmly when the pin or catch $m$ is sprung into the hole $r$.

In order to open or shut the knife, it is necessary, first, to slightly separate the end of the handle by pulling its two halves apart to free the catch $m$ from its hole, then turn the halves in opposite directions until they meet again, when, by the same process, the pin $s$ is replaced and the blade rigidly held and locked, be it opened or shut.

Having thus described my invention, I claim—

The combination of the two halves of the handle and blade $c$, constructed as shown, with the pivoted shoulder and catch and the locking-rod $e$, whereby the handle cannot be opened until the rod has been withdrawn from the catch and the catch turned one-quarter around, substantially as set forth.

In testimony that I claim the foregoing I have hereunto set my hand this 22d day of January, 1880.

AUGUST FRIEBERTSHAUSER.

Witnesses:
SAML. DIESCHER,
T. F. LEHMANN.